(12) United States Patent
Chura

(10) Patent No.: US 11,244,344 B2
(45) Date of Patent: *Feb. 8, 2022

(54) ONLINE MARKETING METHOD

(71) Applicant: DEALER INSPIRE INC., Naperville, IL (US)

(72) Inventor: Joseph Chura, Naperville, IL (US)

(73) Assignee: DEALER INSPIRE INC., Naperville, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/849,812

(22) Filed: Apr. 15, 2020

(65) Prior Publication Data

US 2020/0242656 A1 Jul. 30, 2020

Related U.S. Application Data

(63) Continuation of application No. 15/433,342, filed on Feb. 15, 2017, now Pat. No. 10,628,844.

(60) Provisional application No. 62/295,332, filed on Feb. 15, 2016.

(51) Int. Cl.
*G06Q 30/02* (2012.01)

(52) U.S. Cl.
CPC ..... *G06Q 30/0242* (2013.01); *G06Q 30/0277* (2013.01)

(58) Field of Classification Search
CPC ...................................................... G06Q 30/02
See application file for complete search history.

(56) References Cited

U.S. PATENT DOCUMENTS

| | | | |
|---|---|---|---|
| 2006/0069614 A1* | 3/2006 | Agarwal | G06Q 30/0244 705/14.46 |
| 2009/0292595 A1* | 11/2009 | Tonnison | G06Q 30/0207 705/14.1 |
| 2011/0035276 A1* | 2/2011 | Ghosh | G06Q 30/02 705/14.46 |
| 2011/0035278 A1* | 2/2011 | Fordyce, III | G06Q 30/0256 705/14.49 |
| 2014/0067497 A1* | 3/2014 | Butler | G06Q 30/02 705/14.5 |

* cited by examiner

*Primary Examiner* — Vincent M Cao
(74) *Attorney, Agent, or Firm* — Marshall, Gerstein & Borun LLP

(57) ABSTRACT

The disclosed systems and methods aid advertisers in improving the calculation of the return on investment (ROI) for online marketing. The systems and methods allow advertisers to calculate the ROI of the online marketing of one or a plurality of advertisements by tracking the user identifier of the user devices used to interact with online marketing materials (e.g., online advertisement) and then, once a purchase is made, reconciling which marketing materials the customer interacted leading up to the purchase.

20 Claims, 5 Drawing Sheets

| 1 | Events | |
|---|---|---|
| 2 | Click to call on mobile (mobileHeaderPhone) | x |
| 3 | Clicks to call tablet (tabletHeaderPhone) | x |
| 4 | Click for directions on mobile (mobileHeaderDirections) | x |
| 5 | Click for directions on tablet (tabletHeaderDirections) | x |
| 6 | Filter Search Button (btn advanced-search-btn) | x |
| 7 | Search Anything Magnifying Glass (btn search-anything-submit-btn) | x |
| 8 | Clicks on main CTA on VDP (vdpPrimaryCTA) | x |
| 9 | Click on VRP main CTA | x |
| 10 | Clicks on the Shopping Tools (use classes) | x |
| 11 | Clicks on variation of Principles of Awesomeness dropdown (id-headertab) | x |
| 12 | Inventory Search | |
| 13 | | |

FIG. 3

| HOMEPAGE | Clicks on the menu - desktopHeaderMenuOpen |
| --- | --- |
| | Clicks to close the menu - desktopHeaderMenuClose |
| | Clicks on Desktop Search Anything Button - desktopBannerSearchFiltersBtn |
| | Clicks in the search anything box - desktopBannerSearchAnythingField (click) |
| | Clicks on schedule service button - desktopBannerScheduleServiceBtn |
| | Clicks on VIP Login - desktopHeaderVIPLogin |
| | Clicks on VIP Signup - desktopHeaderVIPSignup |
| | Clicks on Saved Vehicles - (use class) |
| Frames | New Vehicles - desktopsCTANewVehicles (mobile: mobileCTANewVehicles) |
| | Used Vehicles - desktopsCTAUsedVehicles (mobile: mobileCTAUsedVehicles) |
| | Get Financing - desktopCTAFinancing (mobile: mobileCTAFinancing) |
| | ScheduleService - desktopCTAScheduleService (mobile: mobileCTAScheduleService) |
| | |
| | Clicks on Learn More from Preferred Owners Club - preferredOwnersLearnMore |
| | Clicks on Read More from the Fletcher Jones Legacy - legacyReadMore |
| | Clicks on Get Directions - overlayGetDirections |
| | Clicks on Ask a Question Button - askAQuestionBtn |
| | Header maps link: desktopHeaderMapLink |
| | Overlay menu new vehicle search button: overlayNewVehicleSearchBtn (click) |
| | Overlay menu used search button: overlayUsedVehicleSearchBtn (click) |
| | Overlay Menu schedule service button: overlayScheduleServiceBtn |
| | Clicks on homepage search anything magnifying glass (desktop): desktopBannerSearchAnythingBtn (click) |
| | New Vehicles - desktopButtonSidebarNew |
| | Pre-Owned Vehicles - desktopButtonSidebarUsed |
| | Lease Today - desktopButtonSidebarLease |
| | Schedule Test Drive - desktopButtonSidebarTestDrive |
| | Get Pre-Approved - desktopButtonSidebarFinancing |
| | Clicks on down arrow (use class - fa fa-chevron-down) |
| | Clicks on text below search bar (homepageOverlayUSP) |

FIG. 4A

| | |
|---|---|
| SRPs | Search anything field (must use class) - inventory-search-field (click) |
| | Search anything button (must use id) - start_search |
| only tracks on words, not icon | Clicks on View Grid (must use class) - gridtoggle |
| only tracks on words, not icon | Clicks on View List (must use class) - listtoggle |
| | Clicks on the CTA - <br> .button-bar .primary-cta .cta-button |
| | Clicks on VRP details link (create css in backend) New/Used |
| | Clicks on VRP compare link (create css in backend) New/Used |
| | Clicks on VRP image link (create css in backend) New/Used |
| | Clicks on VRP finance link (create css in backend) New/Used |
| | Clicks on VRP save link (create css in backend) New/Used |
| | |
| VDPs | Schedule Test Drive Button (next to Ask a Question) - desktopHeaderScheduleTestDrive |
| | Clicks on the CTA - vdpPrimaryCTA |
| | Shopping Tool Print: print |
| | Shopping Tool Payment Calculator: payment-calculator |
| | Shopping Tool Schedule Test: schedule-testdrive |
| | Shopping Tool Check Availability: availability |
| | Shopping Tool Ask a Question: thumbs-up |
| | Shopping Tool Value your Trade |
| | Shopping Tool Request More Information |
| | |
| MOBILE/TABLET | Click to call - mobileHeaderPhone |
| No tablet mode | Click for directions - mobileHeaderDirections |
| | Clicks on Mobile Orange Search Button - mobileBannerSearchFiltersBtn |
| | Clicks on homepage search anything magnifying glass (mobile): mobileBannerSearchAnythingBtn |
| FLOATING ICONS | Please make the label something like floatingiconservicespecials. Put the page that it's on in the label, because some share the same name on the button but link to different forms. |
| | Target the class and href. Class is floating-button |

FIG. 4B

ONLINE MARKETING METHOD

CROSS-REFERENCE TO RELATED APPLICATIONS

This application comprises a continuation of U.S. application Ser. No. 15/433,342 filed Feb. 15, 2017, which incorporates by reference and claims the benefit of priority to U.S. Provisional Application No. 62/295,332, filed on Feb. 15, 2016, each of which are incorporated herein by its entirety.

BACKGROUND OF THE INVENTION

The present subject matter relates generally to systems and methods of online marketing. More specifically, the present invention relates to systems and methods of online marketing which aid in determining return on investment.

Determining the return on investment (ROI) for advertising and marketing costs is an important metric for every company to monitor. The proliferation of technology and people's ever increasing use of the Internet has meant an unprecedented increase in the number of opportunities for companies to present themselves to customers. Rather it is email, text messages, social media, or advertisements imbedded in streaming media or websites, and there are currently numerous routes a company may take to reach prospective customers. These numerous routes, while providing highly customizable marketing strategies, also present the possibility of increased advertising costs and decreased ROI due to ineffectual advertisements.

The methods for tracking receipt of and responses to advertisements used in prior systems have been addressed in a relatively inefficient manner. Typically, tracking of Internet-based advertising and user responses to the same is accomplished by redirecting a user's response. First, a connection is established with a tracking system that records the user's response to the URL of the selected advertisement or link, and then, the destination IP address URL is provided. If an advertisement placed on a website delivers a customer to a different website for purchase, there is no way for the website in which the advertisement s placed to know for sure what has happened once the user arrives at that buy site. Therefore, the website in which the advertisement is placed has no way to know for sure if it is being compensated properly. In addition, the customer may visit the buy site later, making a purchase that would not be linked to the advertisement placed on the other website.

Click through rate (CTR) is a common online marketing statistic that represents the percentage of people visiting a web page who access a particular advertisement. This statistic may or may not coincide with the ROI for a given ad, but can be used to highlight the assertion above about the possibility of ineffectual online advertisements. The current CTR across all advertisement formats and placements online is estimated to be around 0.06 percent. This means less than 1 click per 1000 views of a given advertisement. While some companies may find this number frustratingly low, some advertising formats such as media rich advertisements or those placed on social media may double or even triple the average CTR rate.

This increased CTR rate suggests what most already know, some advertising methods are more effective than others. The issue companies' face currently is that while they do know which advertising methods are the most effective in garnering consumer interest (based off CTR and other statistics), they are unable to determine which method (s) lead to the most sales. This ability, to determine information about what advertisements lead to the most sales, is difficult to evaluate currently because typically there is little to no information which ties a sale to a given advertisements.

Presently, customers who view Internet advertisements do so almost completely anonymously. Only the most basic information, such as an IP address or device identification number is typically recorded when a customer views an online ad. Presently, this information cannot be reconciled with a customer's contact information unless they willing provide it as part of the advertisement (e.g., filling out a form to obtain a quote on a product). This is a rarity and typically advertisers have no idea what, if any, advertisements were viewed by a customer prior to making a purchase.

As shown, there has been no effective system or method available to advertisers to assess which advertisements their customers view and which are ignored when making a purchase. Basic statistics such a click through rate (CTR) can be recorded and reported, but there is no way to know which of these click through interactions lead to a sale. Accordingly, there is a need for a method of online marketing which associates users who have made a purchase to the advertisement(s) that lead to that purchase in order to determine ROI.

BRIEF SUMMARY OF THE INVENTION

To meet the needs described above and others, the present disclosure provides systems and methods of associating customer contact information with an user identifier associated with an electronic device used by a customer to interact with online marketing. In addition, the systems include techniques for actively identifying user identifiers to associate with customers that have completed purchases but whose contact information does not already include an associated UID.

The disclosed systems and methods aid advertisers in improving the calculation of the return on investment (ROI) for online marketing by allowing advertisers to calculate the ROI of the online marketing of one or a plurality of advertisements by tracking the user identifier of the user devices used to interact with online marketing materials (e.g., online advertisement) and then, once a purchase is made, reconciling which marketing materials the customer interacted leading up to the purchase.

In an embodiment, the system includes a controller; a memory coupled to the controller, wherein the memory is configured to store program instructions executable by the controller; wherein in response to executing the program instructions, the controller is configured to: upon a user selecting a displayed advertisement on the user interface, receive a user identifier associated with a computer device associated with the user, and an advertisement identifier associated with the selected advertisement; communicating the user identifier and associated advertisement identifier to a tracking system in communication with the controller, wherein upon receiving the user identifier and advertisement identifier, the tracking system stores the user identifier and advertisement identifier in a tracking database; receive purchase information from a business associated with the selected advertisement, wherein the purchase information includes a purchase identifier; communicate the purchase information to the tracking system, wherein the tracking system associates the purchase identifier with the user identifier, wherein the tracking system calculates a return of investment of the selected advertisement based on the purchase information and selected advertisement; and communicate the return on investment data to the business.

In an embodiment, the system includes a controller; a memory coupled to the controller, wherein the memory is configured to store program instructions executable by the controller; wherein in response to executing the program instructions, the controller is configured to: receive purchase information from a business, wherein the purchase information includes a purchaser identifier and a business identifier; communicate the purchase information to a tracking system, wherein the tracking system includes a tracking database including at least one user identifier associated with user activity data associated with a selected advertisement, wherein the selected advertisement is associated with the business identifier; receive a user identifier associated with a post-purchase marketing solicitation associated with the business associated with the purchase information; communicate the user identifier to the tracking system, wherein the tracking system matches the user identifier with the purchase identifier stored in the tracking database, wherein the tracking system identifies the selected advertisement associated with the user identifier, wherein the selected advertisement is associated with the business identifier; wherein the tracking system calculates a return of investment of the selected advertisement based on the selected advertisement and the purchase information associated with the selected advertisement; and communicates the return on investment data to the business.

An advantage of the present invention is the ability to associate customer contact information with a user identifier associated with a user device displaying the advertisement, even when the contact information and user identifier are communicated to the system at different times. Once a user identifier is recorded in the system it is stored permanently along with information about which marketing materials were viewed by the device associated with the user identifier. Once this record is created and stored, at any point the customer provides contact information, the contact information is associated with the user identifier, providing an enhanced ability to determine ROI by potentially recording which marketing materials have led to sales.

Another advantage of this invention is related to this permanent user identifier record. Since the user identifier record can be associated with contact information at any time, post-purchase correlation is possible. This is particularly useful because many consumer do not want to freely give out their contact information when viewing online ads, but may be much more willing to do so post-purchase. Many consumers may never fill out a "get more information" web form presented passively online as part of an advertisement, but many consumers fill out customer satisfaction surveys post-purchase, greatly enhancing the chance to correlate user identifiers to customer contact info.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

FIGS. 3 and 4A-4B are embodiments of spreadsheets containing possible factors used for the attribution scoring scheme.

DETAILED DESCRIPTION OF THE INVENTION

Figure 1:
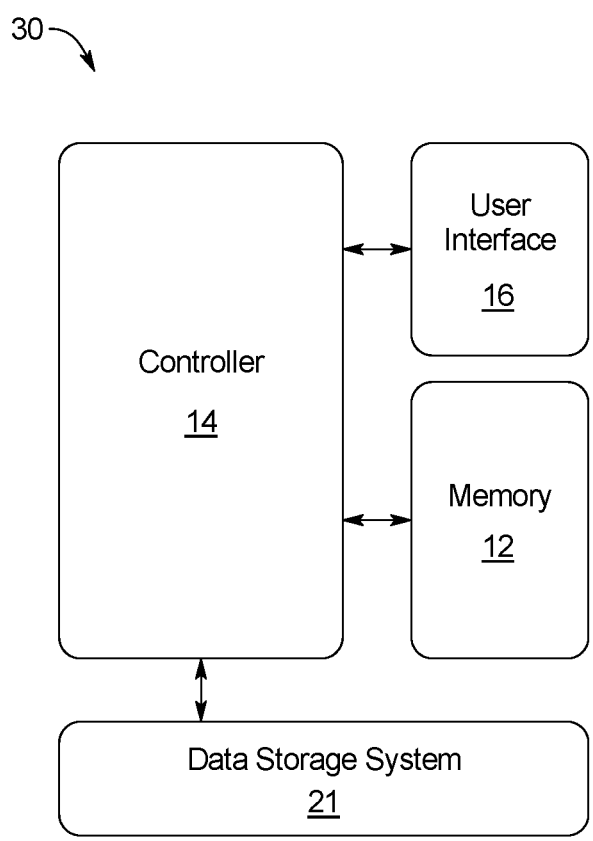
FIG. 1 is a schematic of an embodiment of the system disclosed herein.

The presently disclosed online marketing systems and methods includes a series of components adapted to help a company better ascertain their return on investment (ROI) from online marketing by matching online user activity with contact information associated with a purchase after interacting with an advertisement.

In an example, a user device (e.g., computer, smart phone, etc.) communicates to a tracking system a user identifier (e.g., a unique identifier (UID)) associated with the user device. The user identifier is a preexisting identifier associated with the user device(s) used to interact with the system. The user identifier is communicated to the tracking system through cookies exchanged during the customer's interaction with Internet advertisements and marketing materials (e.g., web pages, email, etc.). The user identifier is associated with customer contact information (e.g., name, email, and telephone number) associated with the user of the user device, wherein the contact information is collected from the consumer/user when the user identifier is communicated to the tracking system or at a previous or later time. By associating the user identifier with an actual customer contact information, the present system provides association between online activity with purchases, which facilitates a business to more accurately identify the ROI for their online marketing.

The advertisement can be any type of advertisement. The online advertisement or other marketing material may come in any number of forms, for example, advertisements and other marketing material may be sent via email, posted on social media, displayed on search engine websites, etc. In an example, the advertisement can be a banner type advertisement, including static or animated, wherein the HTML coding can be downloaded to a the website user's browser. The file may be stored on the same server that stores the HTML file for the web page, or accessed from a remote server. The file may contain a graphic itself, such as in a graphic interchange format or "GIF" file, or a Java applet which, once interpreted and executed by the browser, generates and renders the desired graphic.

The advertisement can be an interstitial advertisement, which is a pre-programmed advertisement that is displayed on websites during the interstitial period between when a user clicks to access a new web page and when the selected web page is displayed to the user. Such advertisements often include a hotlink to enable the user to "click-through" the advertisement to access the website designated by the website advertiser. The length of an interstitial interval, which is variable, is governed by a variety of factors, including, but not limited to, the number of files required to fully render the new page and the size of each such file, network and server congestion and attendant delays occurring when users activate hotlinks. The advertisement can be embedded as an information object in a web page file in such a manner that the object will remain hidden and will not be displayed when the file is executed to render the page. Rather than being displayed, the information object can be locally cached by the website user's browser during execution of the code for that page. Then, during a transition initiated by the user activation of a hotlink to move from one web page to a next successive web page, referred to as an "interstitial period," the user's browser accesses the advertisement from its local cache and displays it until such time as that next successive page is downloaded and rendered.

When a user is presented with the advertisement using the present system and in response clicks or requests a URL from the information provided, the user is taken directly to the URL of interest, while tracking data is independently sent to the tracking system via the controller. The performance of the tracking system is not apparent to the user and does not affect the user's activity. The tracking data can include a user contact information associated with the selected advertisement and an advertisement identification associated with the selected advertisement. The advertisement identification can include information including an a unique advertisement identifier as well as an advertisement location identifier, wherein the advertisement location identifier is associated with a display website identifier where the advertisement was initially displayed for the user to interact. The user activity data can further include several different customizable parameters sent from the destination file viewed rather than merely counting the number of requests. For example, the customizable parameters include further information related to the user's interaction with the advertisement and related website.

Specifically, the present disclosure provides an online marketing tracking system 10 comprising a memory 12 coupled to the controller 14, wherein the memory is configured to store program instructions executable by the controller 14, as shown in FIG. 1.

Figure 2:
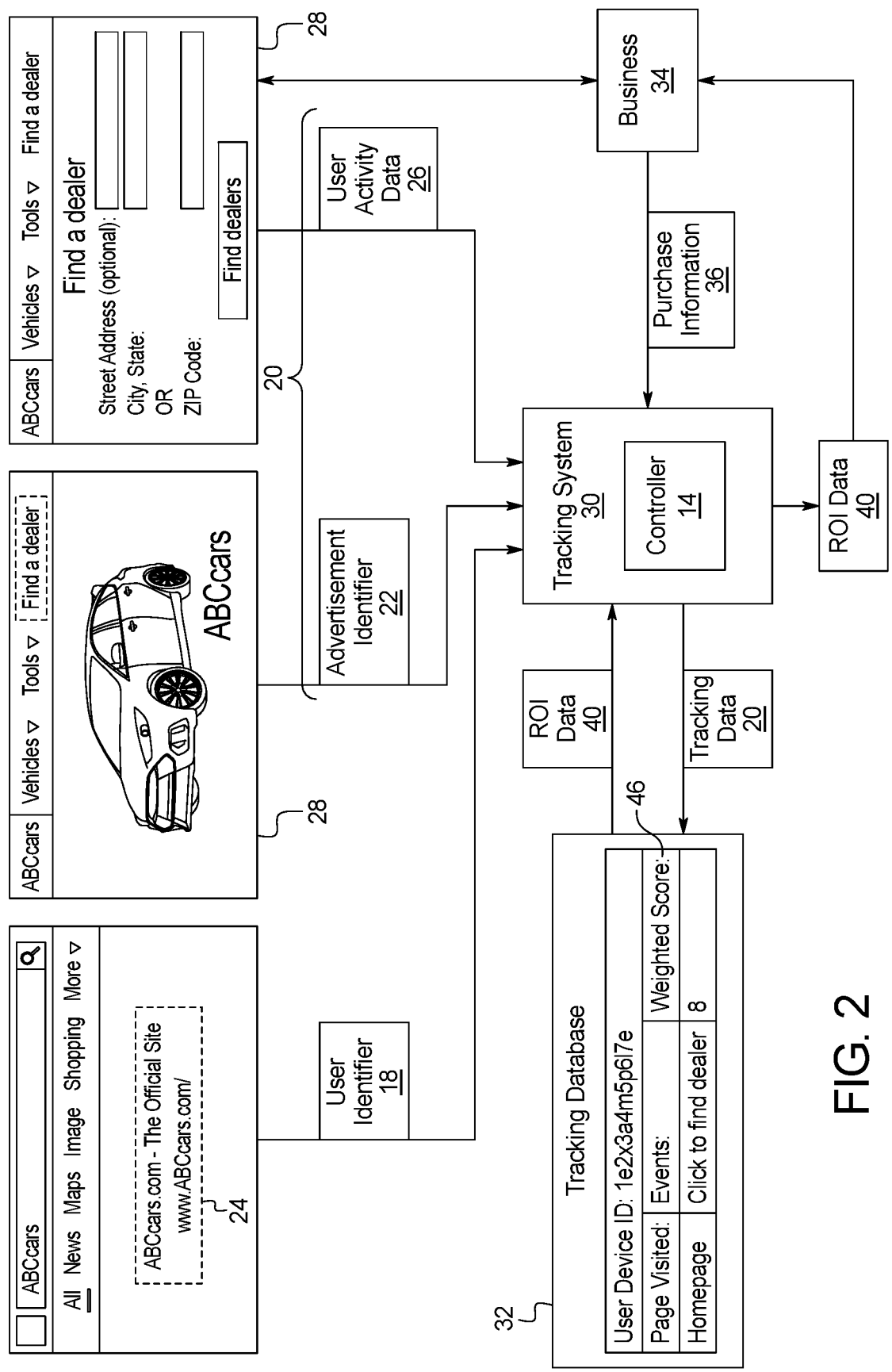
FIG. 2 is a schematic of an embodiment of the system illustrating the interplay between the user activity and the resulting return on investment determination.

FIG. 2 is a diagram which demonstrates the interplay between the user and the present system, wherein the system creates a database record which track actions carried out on an advertiser's website by a user device. As shown in FIG. 2, a customer may utilize a search engine when searching for a product (e.g., cars) online. Search engines and other websites may display advertisements for such products as the customer browses the web and if a customer clicks on such an advertisement, they may be directed to the advertiser's website. When a customer clicks on one of these advertisements, the system may capture the customer's device's UID (i.e., user identifier). The user identifier is then stored in the tracking database along with information about what actions the customer carried out on the advertiser's website associated with the business posting the selected advertisement. Further shown in FIG. 2, a predefined, weighted score is assigned to each action recorded by the system for a given user identifier in the tracking database. The term 'weighted' refers to higher or lower scores given by the system to actions on the advertiser's website which are correlated to garnering sales (e.g., clicking to find the location of a dealership). The information stored in the tracking database includes a cumulative score amounting to the sum of the individual weighted scores for each action undertaken by the corresponding customer.

As shown in FIG. 2, in response to executing the program instructions, the controller 14 is configured to provide a user interface 16 configured to receive a user identifier 18, including user contact information, from a user device associated with the user. The controller is further configured to receive tracking data 20, including an advertisement identifier 22 associated with the selected advertisement 24 and an advertisement location data associated with the selected advertisement. For example, the advertisement location data can indicate what website location the user was engaged with at the time of the selection. In addition, the tracking data 20 can include user activity data 26 associated with the user's activity with the advertiser website 28 associated with the selected advertisement 24.

The user activity data 26 can be any information associated with a user's interaction with the selected website. For example, user activity data 26 can be viewing the advertiser's website 28, along with any interaction with the advertiser's website 28. An example of user activity 26 can include a customer viewing the marketing/advertisement(s) for the car, and additional activity can include the customer filling in his contact information to get a price quote for the car. When the customer submits this information, it is communicated to the tracking system 30 along with the user identifier 18 of the device used to submit the contact information (i.e., user activity 26).

The controller 12 communicates the tracking data 20 to a tracking system 30 including a tracking database 32. When the tracking data 20 includes user activity data 26, the tracking system 30 can calculate a weighted value associated with the user's activity data 26 with the advertiser's website 28.

If the user later purchases the product associated with the selected advertisement, the tracking system 30 via the controller 14 receives the purchase information 36. The purchase information 36 can include a purchase identifier including the contact information of the purchaser, the purchase price of the product purchased, the location of the purchase, and the time and/or date of the purchase. The tracking system 20 matches the purchaser contact information obtained during the sale with the user identifier 18 stored in the tracking system and, using the associated user identifier, any previously tracked online user activity 26 can be attributed to the purchase. The tracking system then calculates the return on investment (ROI) data 40 associated with the purchase of the product associated with the selected advertisement leading to the sale based on the purchase information and the selected advertisement. The return on investment calculation can take into account the purchase price, the cost of the selected advertisement, among other factors.

In another example, a user identifier 18 (e.g., UID) can be associated with customer's contact information post-purchase. For example, if a consumer views an online advertisement for a car, but does not submit contact information, the controller 14 will communicate and record the purchase information 36 received from a business associated with the purchase, wherein the purchase information 36 includes a purchaser identifier and a business identifier 34 in the tracking system 30. A record of the purchase information 36 and associated business identifier 34 will remain in the tracking database 32 and, when the customer later makes a purchase, the user associated with the purchase information 36 is sent a post-purchase marketing solicitation. This marketing solicitation could be any sort of communication, including a consumer satisfaction survey or the like. When the consumer interacts with the post-purchase marketing solicitation, they system records the user identifier 18 and cross-references it against the purchase information 36 stored in the database. If the user identifier 18 captured via the post-purchase marketing solicitation matches a purchase identifier associated with the purchase information 36 previously recorded in the tracking system 30, the tracking system 30 can associate the purchaser identifier collected from the business during purchase with the user identifier 18, in order to calculate the ROI data 40.

Once a user identifier 18 is associated with the purchaser identifier of the purchase information 36 of a consumer who made a purchase, the tracking system 30 can then determine ROI data 40 based off the weighted user activity and event based attribution. The ROI data 40 can be calculated based on the gross profit made off a sale and attributing the profit made pro rata according to an event based attribution scheme. This event based attribution scheme may use predefined weighted scoring of various interactions with webpages user are linked to by the advertisements. The various interactions recorded by a given user identification 18 are used to determine the portion of sale attributable to each advertisement involved in garnering a sale. The weighted scores associated with user activity 26 in the tracking database 32 are calculated by the tracking system 30 by awarding more points to user actions which are more likely to garner a sale and once awarded, the scores can be used to determine the percentage of sale attributed to a given advertisement 28. The percentage of sale attributed to each advertisement may then be used to calculate the ROI data 40 for each advertisement involved in garnering a sale. ROI data 40 may be calculated by examining the percentage of gross profit attributable to an advertisement versus the cost of posting it.

As mentioned previously herein, the tracking system can attribute certain scores for user activity 26 interactions with a selected advertiser website 28 linked to the advertisements 24 displayed. For example, the tracking system may assign a weighted score of 1 for each click on an advertisement which leads the customer to the advertiser's homepage. Higher scores may be given for interactions with the advertiser's website that are more likely to lead to a sale, such as clicking a link to speak with a sales representative (given a score of 5, for this example). If a customer does not interact with the email advertisement, "clicks through" the social media advertisement four times to visit the advertiser's homepage, and "clicks through" an search engine advertisement to speak with a sales rep once, the tracking system calculates an attribution score of 44% to the social media advertisement (a weighted score of 4), 56% to the search engine advertisement (a weighted score of 5), and 0% to the email ad.

FIGS. 3 and 4A-4B are spreadsheets that demonstrate an event based attribution scoring scheme which may be utilized by the online marketing system. These attribution scores can be used to determine the amount of gross profit to be attributed to each advertisement. For example, if $1,000 dollars was made off the sale of the item advertised via email, social media, and search engine above, $444 dollars could be are attributed to the social media advertisement and $566 dollars of profit could be are attributed to the search engine advertisement. These numbers can then be used to determine the ROI data for the advertisements placed based off the cost of placing the advertisements.

As mentioned above and schematically shown in FIG. 1, aspects of the systems and methods described herein are controlled by one or more controllers 14. The one or more controllers 14 may be adapted to run a variety of application programs, access and store data, including accessing and storing data in the associated databases 16, and enable one or more interactions as described herein. Typically, the controller 14 is implemented by one or more programmable data processing devices. The hardware elements, operating systems, and programming languages of such devices are conventional in nature, and it is presumed that those skilled in the art are adequately familiar therewith.

For example, the one or more controllers 14 may be a PC based implementation of a central control processing system utilizing a central processing unit (CPU), memory 12 and an interconnect bus. The CPU may contain a single microprocessor, or it may contain a plurality of microprocessors for configuring the CPU as a multi-processor system. The memory 12 may include a main memory, such as a dynamic random access memory (DRAM) and cache, as well as a readvertisement only memory, such as a PROM, EPROM, FLASH-EPROM, or the like. The system may also include any form of volatile or non-volatile memory 12. In operation, the memory 12 stores at least portions of instructions for execution by the CPU and data for processing in accord with the executed instructions.

The one or more controllers 14 may also include one or more input/output interfaces for communications with one or more processing systems. Although not shown, one or more such interfaces may enable communications via a network, e.g., to enable sending and receiving instructions electronically. The communication links may be wired or wireless.

The one or more controllers 14 may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces 16 for the controller 14. For example, the one or more controllers 14 may include a graphics subsystem to drive the output mechanism. The links of the peripherals to the system may be wired connections or use wireless communications.

Although summarized above as a PC-type implementation, those skilled in the art will recognize that the one or more controllers 14 also encompasses systems such as host computers, servers, workstations, network terminals, and the like. Further one or more controllers 14 may be embodied in a device, such as a mobile electronic device, like a smartphone or tablet computer. In fact, the use of the term controller 14 is intended to represent a broadvertisement category of components that are well known in the art.

Hence aspects of the systems and methods provided herein encompass hardware and software for controlling the relevant functions. Software may take the form of code or executable instructions for causing a controller 14 or other programmable equipment to perform the relevant steps, where the code or instructions are carried by or otherwise embodied in a medium readable by the controller 14 or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory 14 of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller 14 can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A system comprising:
a controller;
a memory coupled to the controller, wherein the memory is configured to store program instructions executable by the controller;
wherein in response to executing the program instructions, the controller is configured to:
upon a user selecting a displayed advertisement on the user interface, receive a user identifier associated with a computer device associated with the user, and an advertisement identifier associated with the selected advertisement;
communicate the user identifier and associated advertisement identifier to a tracking system in communication with the controller, wherein upon receiving the user identifier and advertisement identifier, the tracking system stores the user identifier and advertisement identifier in a tracking database;
receive purchase information from a business associated with the selected advertisement, wherein the purchase information includes a purchase identifier, a business identifier, and a gross profit associated with a purchased product associated with the business identifier;
communicate the purchase information to the tracking system, wherein the tracking system matches the purchase identifier with the user identifier;
receive user activity data associated with the selected advertisement, wherein the tracking system calculates a weighted score associated with the user activity associated with the selected advertisement, wherein the tracking system calculates a return on investment of the selected advertisement based on the purchase information, the selected advertisement, the gross profit, and the weighted score, wherein calculating the return on investment includes attributing the gross profit according to an event-based attribution scheme; and
communicate the return on investment data to the business associated with the business identifier.

2. The system of claim 1, wherein the user activity includes viewing the website of the business associated with the selected advertisement.

3. The system of claim 1, wherein the user activity includes requesting a price quote from the website of the business associated with the selected advertisement.

4. The system of claim 1, wherein the user activity includes interacting with a sales representative of the business associated with the selected advertisement.

5. The system of claim 1, wherein the user identifier includes user contact information.

6. The system of claim 1, wherein the purchase identifier includes purchaser contact information.

7. The system of claim 1, wherein the return on investment of a selected advertisement indicates a portion of a purchase price attributable to the selected advertisement, wherein the purchase price is associated with a purchased product associated with the business identifier.

8. A method of calculating return on interest data for an advertisement, the method comprising:
upon a user selecting a displayed advertisement on the user interface, receiving, by a processor, a user identifier associated with a computer device associated with the user, and an advertisement identifier associated with the selected advertisement;
communicating, by the processor, the user identifier and associated advertisement identifier to a tracking system in communication with the controller, wherein upon receiving the user identifier and advertisement identifier, the tracking system stores the user identifier and advertisement identifier in a tracking database;
receiving, by the processor, purchase information from a business associated with the selected advertisement, wherein the purchase information includes a purchase identifier, a business identifier, and a gross profit associated with a purchased product associated with the business identifier;
communicating, by the processor, the purchase information to the tracking system, wherein the tracking system matches the purchase identifier with the user identifier;
receiving, by the processor, user activity data associated with the selected advertisement, wherein the tracking system calculates a weighted score associated with the user activity associated with the selected advertisement, wherein the tracking system calculates a return on investment of the selected advertisement based on the purchase information, the selected advertisement, the gross profit, and the weighted score, wherein calculating the return on investment includes attributing the gross profit according to an event-based attribution scheme; and
communicating, by the processor, the return on investment data to the business associated with the business identifier.

9. The method of claim 8, wherein the user activity includes viewing the website of the business associated with the selected advertisement.

10. The method of claim 8, wherein the user activity includes requesting a price quote from the website of the business associated with the selected advertisement.

11. The method of claim 8, wherein the user activity includes interacting with a sales representative of the business associated with the selected advertisement.

12. The method of claim 8, wherein the user identifier includes user contact information.

13. The method of claim 8, wherein the purchase identifier includes purchaser contact information.

14. The method of claim 8, wherein the return on investment of a selected advertisement indicates a portion of a purchase price attributable to the selected advertisement, wherein the purchase price is associated with a purchased product associated with the business identifier.

15. The method of claim 8, wherein the purchase identifier includes purchaser contact information.

16. A non-transitory, computer-readable medium storing instructions that specifically configure one or more processors of a computer system such that, when executed by one or more processors, the instructions cause the computer system to:
upon a user selecting a displayed advertisement on the user interface, receive, by a processor, a user identifier associated with a computer device associated with the user, and an advertisement identifier associated with the selected advertisement;

communicate, by the processor, the user identifier and associated advertisement identifier to a tracking system in communication with the controller, wherein upon receiving the user identifier and advertisement identifier, the tracking system stores the user identifier and advertisement identifier in a tracking database;

receive, by the processor, purchase information from a business associated with the selected advertisement, wherein the purchase information includes a purchase identifier, a business identifier, and a gross profit associated with a purchased product associated with the business identifier;

communicate, by the processor, the purchase information to the tracking system, wherein the tracking system matches the purchase identifier with the user identifier;

receive, by the processor, user activity data associated with the selected advertisement, wherein the tracking system calculates a weighted score associated with the user activity associated with the selected advertisement, wherein the tracking system calculates a return on investment of the selected advertisement based on the purchase information, the selected advertisement, the gross profit, and the weighted score, wherein calculating the return on investment includes attributing the gross profit according to an event-based attribution scheme; and communicate, by the processor, the return on investment data to the business associated with the business identifier.

17. The non-transitory, computer-readable medium of claim 16, wherein the user activity includes viewing the website of the business associated with the selected advertisement.

18. The non-transitory, computer-readable medium of claim 16, wherein the user activity includes requesting a price quote from the website of the business associated with the selected advertisement.

19. The non-transitory, computer-readable medium of claim 16, wherein the user activity includes interacting with a sales representative of the business associated with the selected advertisement.

20. The non-transitory, computer-readable medium of claim 16, wherein the user identifier includes user contact information.

\* \* \* \* \*